(12) United States Patent
Kushima et al.

(10) Patent No.: US 12,456,750 B2
(45) Date of Patent: Oct. 28, 2025

(54) LITHIUM SECONDARY BATTERY AND METHOD OF MANUFACTURE

(71) Applicants: University of Central Florida Research Foundation, Inc., Orlando, FL (US); Honda Motor Co., Ltd., Tokyo (JP)

(72) Inventors: Akihiro Kushima, Orlando, FL (US); Supriya Koul, Orlando, FL (US); Yoshiya Fujiwara, Wako (JP); Yoshiyuki Morita, Wako (JP); Fumika Fujisaki, Wako (JP); Hiroshi Ogasa, Wako (JP)

(73) Assignees: University of Central Florida Research Foundation, Inc., Orlando, FL (US); Honda Motor Co., Ltd., Tokyo (JP)

( * ) Notice: Subject to any disclaimer, the term of this patent is extended or adjusted under 35 U.S.C. 154(b) by 830 days.

(21) Appl. No.: 17/683,651

(22) Filed: Mar. 1, 2022

(65) Prior Publication Data

US 2022/0393228 A1    Dec. 8, 2022

Related U.S. Application Data

(60) Provisional application No. 63/156,069, filed on Mar. 3, 2021.

(51) Int. Cl.
  *H01M 10/0525* (2010.01)
  *H01M 4/02* (2006.01)
  (Continued)

(52) U.S. Cl.
  CPC .......... *H01M 10/0525* (2013.01); *H01M 4/02* (2013.01); *H01M 4/131* (2013.01);
  (Continued)

(58) Field of Classification Search
  CPC .... H01M 10/0525; H01M 4/131; H01M 4/02; H01M 10/0481; H01M 10/0562;
  (Continued)

(56) References Cited

U.S. PATENT DOCUMENTS

| | | | |
|---|---|---|---|
| 2014/0272594 A1* | 9/2014 | Safont Sempere | ... H01M 4/134 |
| | | | 429/231.95 |
| 2020/0083542 A1 | 3/2020 | Yushin et al. | |

(Continued)

FOREIGN PATENT DOCUMENTS

| | | |
|---|---|---|
| CN | 104620416 A | 5/2015 |
| CN | 106711430 A | 5/2017 |

(Continued)

OTHER PUBLICATIONS

Direct growth of 3D host on Cu foil for stable lithium metal anode Fei Shena, Fan Zhanga, Yongjia Zhengb, Zhaoyang Fana, Zhihui Lia, Zhouting Suna, Yingying Xuana, Bin Zhaoa, Zhiqiang Linb, Xuchun Guib,, Xiaogang Hana,c,, Yonghong Chenga, Chunming Niu; Energy Storage Materials 13 (2018) 323-328 (Year: 2018).*

(Continued)

*Primary Examiner* — Miriam Stagg
(74) *Attorney, Agent, or Firm* — Molly L. Sauter; Smith & Hopen, P.A.

(57) ABSTRACT

A lithium (Li) secondary battery having a Li buffer layer compressed between a Li metal anode and an electrolyte of the battery cell and a porous structure positioned between the Li metal anode and a current collector of the battery cell. The Li buffer layer is effective in preventing uncontrollable dendrite growth. The porous structure layer is effective in guiding the location of the Li deposition, thereby reducing the volume changes of the Li anode during the charge and discharge cycles of the lithium secondary battery.

11 Claims, 6 Drawing Sheets

(51) Int. Cl.
  *H01M 4/131* (2010.01)
  *H01M 10/04* (2006.01)
  *H01M 10/0562* (2010.01)

(52) U.S. Cl.
  CPC ... *H01M 10/0481* (2013.01); *H01M 10/0562* (2013.01); *H01M 2004/027* (2013.01); *H01M 2004/028* (2013.01)

(58) Field of Classification Search
  CPC ......... H01M 10/052; H01M 2004/027; H01M 2004/028; H01M 4/382
  See application file for complete search history.

(56) References Cited

U.S. PATENT DOCUMENTS

| | | | |
|---|---|---|---|
| 2020/0087155 A1* | 3/2020 | Rupert | C01D 15/04 |
| 2020/0243841 A1 | 7/2020 | Yang et al. | |
| 2020/0343582 A1* | 10/2020 | Li | H01M 4/134 |
| 2022/0278318 A1* | 9/2022 | Locke | H01M 10/0525 |

FOREIGN PATENT DOCUMENTS

| | | |
|---|---|---|
| CN | 110506027 A | 11/2019 |
| CN | 111213260 A | 5/2020 |
| CN | 112216818 A | 1/2021 |
| KR | 20190115365 A | 10/2019 |
| WO | 2014028218 A1 | 2/2014 |
| WO | 2018164936 A1 | 9/2018 |
| WO | WO-2019195553 A1 * 10/2019 .......... H01M 10/052 |  |

OTHER PUBLICATIONS

The role of carbon black distribution in cathodes for Li ion batteries Robert Dominkoa, Miran Gaberscekaa,*, Jernej Drofenika, Marjan Belea, Stane Pejovnikb, Janko Jamnik / Journal of Power Sources 119-121 (2003) 770-773 (Year: 2003).*

Nickel-rich Nickel Manganese Cobalt (NMC622) Cathode Lithiation Mechanism and Extended Cycling Effects Using Operando X-ray Absorption Spectroscopy; Killian R. Tallman, Garrett P. Wheeler, Christopher J. Kern, Eli Stavitski, Xiao Tong, ,J. Phys. Chem. C 2021, 125, 58-73 (Year: 2021).*

High-Conductivity Argyrodite Li6PS5CI Solid Electrolytes Prepared via Optimized Sintering Processes for All-Solid-State Lithium-Sulfur Batteries; Shuo Wang, Yibo Zhang, Xue Zhang, Ting Liu, Yuan-Hua Lin, Yang Shen, Li ACS Appl. Mater. Interfaces 2018, 10, 42279-42285 (Year: 2018).*

High-performance Li6PS5Cl-based all-solid-state lithium-ion batteries†; Shuo Wang, Xiaofu Xu, Xue Zhang, Chengzhou Xin, Bingqing Xu, Liangliang Li, Yuan-Hua Lin, Yang Shen, Baohua Lib and Ce-Wen Nan. J. Mater. Chem. A, 2019, 7, 18612 (Year: 2019).*

Interface engineering of sulfide electrolytes for all-solid-state lithium batteries Ruochen Xua , Fudong Hana, Xiao Jia, Xiulin Fan, Jiangping Tu, Chunsheng Wang Nano Energy 53 (2018) 958-966 (Year: 2018).*

Progress and perspectives on halide lithium conductors for all-solid-state lithium batteries† Xiaona Li, ‡ Jianwen Liang, ‡ Xiaofei Yang, Keegan R. Adair, Changhong Wang, Energy Environ. Sci., 2020, 13, 1429 (Year: 2020).*

The role of electronic and ionic conductivities in the rate performance of tunnel structured manganese oxides in Liion batteries B. W. Byles; N. K. R. Palapati; A. Subramanian; E. Pomerantseva APL Mater. 4, 046108 (2016) (Year: 2016).*

High electronic conductivity as the origin of lithium dendrite formation within solid electrolytes; Fudong Han, Andrew S. Westover2, Jie Yue1, Xiulin Fan1, Fei Wang 1, Miaofang Chi,Donovan N. Leonard2, Nancy J. Dudney 2*, Howard Wang 4* and Chunsheng Wang; Nature Energy | vol. 4 | Mar. 2019 | 187-196 (Year: 2019).*

Supplementary Material, Direct Growth of 3D Host on Cu for Stable Lithium Metal Anode Fei Shen et. al., Energy Storage Materials 13 (2018) 323-328 (Year: 2018).*

First Office Action issued Dec. 26, 2023 for corresponding CN Application No. 202210204911.0, Applicants University of Central Florida Research Foundation, Inc. et al. action and machine translation.

Chen, Y. et al. Li metal deposition and stripping in a solid-state battery via Coble creep. Nature, vol. 578, Feb. 2020. pp. 251-256.

Lee, Y.G. et al. High-energy long-cycling all-solid-state lithium metal batteries enabled by silver-carbon composite anodes. Nature Energy, vol. 5., Apr. 2020, pp. 299-308.

Wan, G. et al. Suppression of Dendritic Lithium Growth by in Situ Formation of a Chemically Stable and Mechanically Strong Solid Electrolyte Interphase. ACS Applied Materials & Interfaces, Oct. 2018, pp. 593-601.

Second Office Action issued Jun. 24, 2024 for corresponding CN Application No. 202210204911.0, Applicants University of Central Florida Research Foundation, Inc. et al.

Notice of Allowance issued Dec. 18, 2024 for corresponding Chinese Patent Application No. 202210204911.0.

* cited by examiner

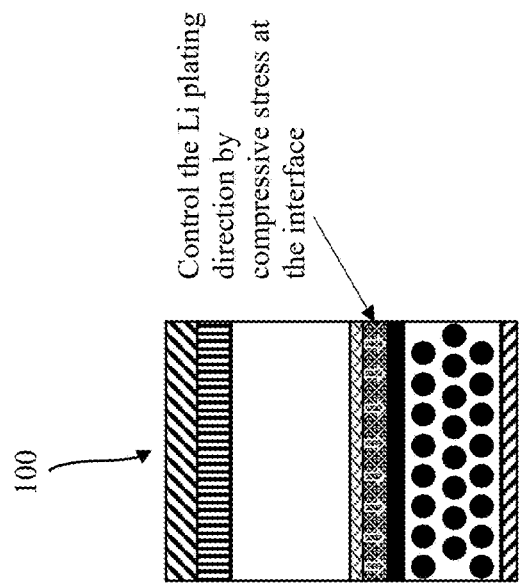
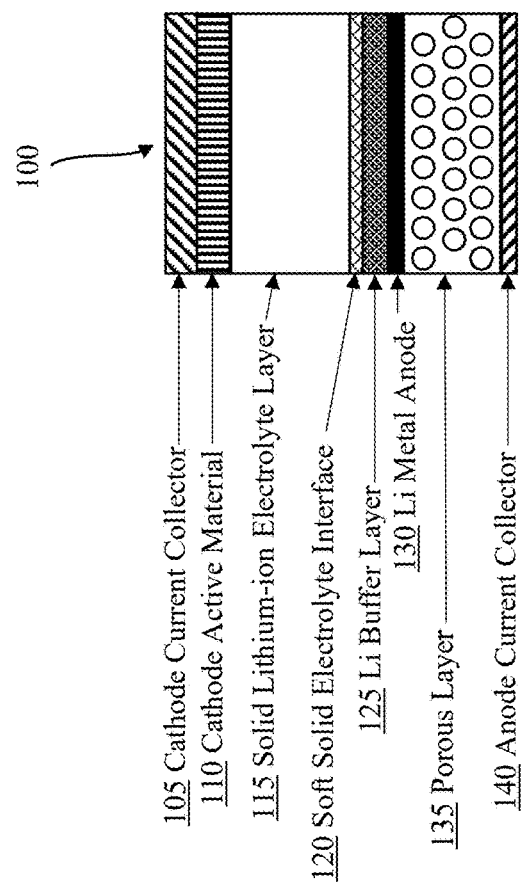
FIG. 1A
FIG. 1B
105 Cathode Current Collector
110 Cathode Active Material
115 Solid Lithium-ion Electrolyte Layer
120 Soft Solid Electrolyte Interface
125 Li Buffer Layer
130 Li Metal Anode
135 Porous Layer
140 Anode Current Collector
Charge
Discharge
Control the Li plating direction by compressive stress at the interface

LITHIUM SECONDARY BATTERY AND METHOD OF MANUFACTURE

CROSS-REFERENCE TO RELATED APPLICATIONS

This application claims priority to currently U.S. Provisional Patent Application No. 63/156,069, filed on Mar. 3, 2021, and entitled "CONTROLLING LITHIUM PLATING BY LITHIUM-CONDUCTING BUFFER AND POROUS ANODE SCAFFOLD", which is herein incorporated by reference in its entirety.

BACKGROUND OF THE INVENTION

In a typical solid-state lithium-ion battery, the anode and the cathode are separated by a solid electrolyte. During the charging and discharging of the battery, the lithium ions travel within the electrolyte between the anode and the cathode.

It is well known that the use of a lithium metal anode in a battery cell results in the growth of dendrites at the surface of the anode, as the battery cell experiences multiple charge/discharge cycles and/or a high-rate charge/discharge event. Dendrite growth leads to micro-shorts between the cathode and the anode, resulting in degradation of the battery cell.

Accordingly, what is needed in the art is an improved rechargeable lithium battery cell that is effective in controlling the growth of dendrites on the surface of the lithium metal anode, thereby prolonging the lifetime of the battery.

However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

SUMMARY OF THE INVENTION

In various embodiments, the present invention provides an improved secondary (rechargeable) lithium metal battery which exhibits stable charge/discharge performance and controlled volumetric change during charging and discharging of the battery.

In one embodiment, the rechargeable battery of the present invention comprises a solid-state electrolyte. In an additional embodiment, the rechargeable battery cell comprises a hybrid-electrolyte which includes a mixture of liquid and solid electrolyte.

In a particular embodiment, a lithium secondary battery is provided which includes, a lithium (Li) metal anode, a cathode layer and a Li-ion electrolyte layer positioned between the Li metal anode and the cathode layer. The battery further includes a Li buffer layer compressed between the Li metal anode and the Li-ion electrolyte layer, an anode current collector and a porous layer positioned between the Li metal anode and the anode current collector. The Li buffer layer is compressed between the Li metal anode and the electrolyte layer at a pressure of at least 0.1 MPa (megapascal) to maintain the porosity of the porous layer.

The cathode layer may further include, a cathode current collector and a cathode active material positioned between the cathode current collector and the electrolyte layer.

In a particular embodiment, the cathode active material may include $LiNi_{0.6}Mn_{0.2}Co_{0.2}O_2$ (NMC) powder, carbon black conductive additive and lithium phosphorus sulfur chloride ($Li_6PS_5Cl$) powder at a weight ratio of 70:5:25, respectively.

In general, the Li buffer layer provides high Li-ion conductivity and low electrical conductivity, and the Li buffer layer has a lower Li-ion conductivity than the electrolyte layer. In particular, the Li buffer layer may include lithium and one or more lithium compounds (LiX) selected from lithium chloride, (LiCl), lithium fluoride (LiF), lithium bromide (LiBr) and lithium iodide (LiI). In a particular embodiment, the concentration of the lithium compound in the Li buffer layer may be between about 10 mol % and about 70 mol %, and preferable between about 30 mol % and about 50 mol %. In an additional embodiment, the Li buffer layer may further include a composite comprising solid electrolyte (SE) and one or more lithium compounds (LiX) selected from lithium chloride, (LiCl), lithium fluoride (LiF), lithium bromide (LiBr) and lithium iodide (LiI).

The one embodiment, the electrolyte layer may be a solid Li-ion electrolyte. In particular, the electrolyte layer may be comprised of lithium phosphorus sulfur chloride ($Li_6PS_5Cl$) powder. In an alternate embodiment, the electrolyte layer may be a hybrid-electrolyte comprising a mixture of liquid and solid Li-ion electrolyte.

The porous layer includes at least one mixed-ion-electron conductor and in particular, the porous layer may include $Li_{6.4}Ga_{0.2}La_3Zr_2O_{12}$ (LLZO) and carbon fiber.

While various methods and techniques may be employed in the manufacturing of the lithium secondary battery described above, in a particular embodiment a method for manufacturing the lithium secondary battery may include, providing a cathode layer, positioning an electrolyte adjacent to the cathode layer, positioning a Li buffer layer adjacent to the electrolyte layer, establishing a compressive stress between the Li buffer layer and the electrolyte layer, positioning a Li metal anode layer on the Li buffer layer, positioning a porous structure layer on the Li metal anode layer and positioning an anode current collector on the porous structure layer.

Various embodiments of the present invention provide for the use of a lithium metal anode in a lithium secondary (rechargeable) battery, which significantly improves the volumetric and gravimetric capacity of the battery. The embodiments also prevent inherent issues that are common in battery cells that utilize lithium metal anodes, such as dendrite formation and large volume changes during charge/discharge cycles.

The embodiments are applicable to numerous fields requiring rechargeable batteries, including but not limited to, electric vehicles, portable electronics and various other applications requiring high capacity, long cycle lifetime and minimum volume changes during charge/discharge cycles.

The invention accordingly provides improved rechargeable lithium battery that is effective in controlling the growth of dendrites on the surface of the lithium metal anode and mitigation of the overall volume changes of the battery using a Li buffer layer and a porous structure at the Li metal anode, thereby prolonging the lifetime of the battery

BRIEF DESCRIPTION OF THE DRAWINGS

For a fuller understanding of the invention, reference should be made to the following detailed description, taken in connection with the accompanying drawings, in which:

FIG. 1A illustrates a lithium secondary battery during a charge cycle of the battery, in accordance with an embodiment of the present invention.

FIG. 1B illustrates the lithium secondary battery of FIG. 1A during a discharge cycle of the battery, in accordance with an embodiment of the present invention.

DETAILED DESCRIPTION OF THE INVENTION

Figure 2:
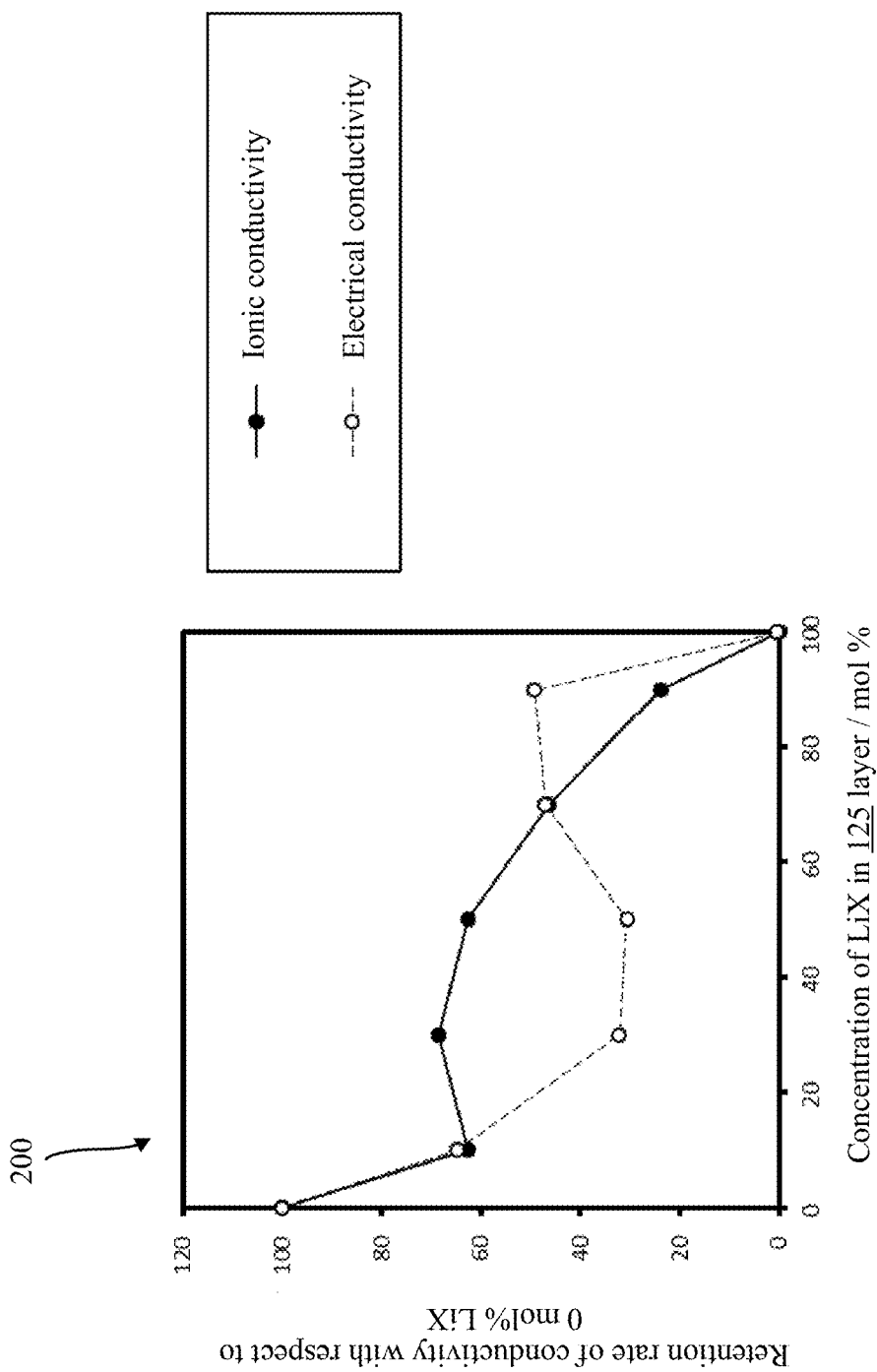
FIG. 2 is a graphical illustration of the change in retention rate of conductivity with respect to 0 mol % LiX relative to the concentration of LiX (mol) in the Li buffer layer, in accordance with an embodiment of the lithium secondary battery of the present invention.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

In lithium metal batteries currently known in the art, the lithium metal anode is deposited on a current collector resulting in a volume change of the lithium metal anode and the overall battery cell, regardless of whether lithium buffer layers are employed on the lithium metal anode.

In various embodiments of the present invention, a porous structure comprising mixed-ion-electron conductivity in the anode of the lithium secondary battery and a lithium (Li) buffer layer are combined, with applied compressive stress, to form the lithium secondary battery of the present invention. The porous structure of the anode forms a scaffolding formation at the lithium metal anode layer that is effective in guiding the lithium deposition to a designated area, i.e., pre-existing pores in the porous structure. As such, the inventive embodiments allow for uniform deposition at/on the Li metal anode using the Li buffer layer and also provides for mitigation of the overall volume changes of the battery using the porous structure of the Li metal anode.

FIG. 1A illustrates a lithium secondary battery during a charging cycle of the battery 100, in accordance with an embodiment of the present invention. FIG. 1B illustrates the lithium secondary battery of FIG. 1A during a discharging cycle of the battery 100, in accordance with an embodiment of the present invention.

As shown in FIG. 1A and FIG. 1B, an all-solid-state rechargeable (secondary) lithium battery 100 in accordance with an embodiment of the present invention includes a cathode layer including a cathode current collector 105 and a cathode active material 110 positioned on the cathode current collector 105. The cathode active material 110 may be selected from oxides, including but not limited to, $LiNi_xMn_yCo_zO_2$, $LiCoO_2$, $LiFePO_4$. Alternatively, the cathode active material 110 may be selected from other Li composites, such as sulfides. In a specific embodiment, the cathode active material 110 may include $LiNi_{0.6}Mn_{0.2}Co_{0.2}O_2$ (NMC) powder, carbon black conductive additive and lithium phosphorus sulfur chloride ($Li_6PS_5Cl$) powder at a weight ratio of 70:5:25, respectively. However, this is not intended to be limiting and various other compounds and ratios are within the scope of the present invention to provide the cathode active material 110.

The lithium secondary battery further includes a solid lithium-ion electrolyte layer 115 positioned on the cathode active material 110, a Li buffer layer 125 positioned on the solid lithium-ion electrolyte layer 115. The lithium secondary battery further includes an anode layer including a lithium metal anode 130 positioned on the Li buffer layer 125, a porous layer 135 positioned on the Li metal anode 130 and an anode current collector 140 positioned on the porous layer 135. The porous layer 135 is compressed between the Li metal anode 130 and the anode current collector 140.

In general, the Li buffer layer 125 provides a high Li-ion conductivity and low electrical conductivity. The Li buffer layer 125 may be comprised of a lithium alloy at a concentration of between 1%-99%. As such, the Li buffer layer 125 provides ion conductivity and electron insulating properties to inhibit the formation of dendrites on the lithium metal anode 130, thereby preventing micro-shorts from forming in the battery 100.

In a particular embodiment, the Li buffer layer 125 incudes lithium and one or more lithium compounds (LiX). The lithium compounds may include lithium chloride, (LiCl), lithium fluoride (LiF), lithium bromide (LiBr) and lithium iodide (LiI). Table I illustrates the relationship between the ionic conductivity and electrical conductivity based upon the mol ratio between lithium and fluoride in the Li buffer layer 125.

TABLE I

| | mol ratio LiF:Solid Electrolyte | Ionic conductivity S/cm@25° C. | Electronic conductivity S/cm@25° C. |
|---|---|---|---|
| LiF-00 | 0:100 | $6.7 \times 10^{-3}$ | $1.4 \times 10^{-8}$ |
| LiF-10 | 10:90 | $4.2 \times 10^{-3}$ | $9.08 \times 10^{-9}$ |
| LiF-30 | 30:70 | $4.6 \times 10^{-3}$ | $4.5 \times 10^{-9}$ |
| LiF-50 | 50:50 | $4.2 \times 10^{-3}$ | $4.3 \times 10^{-9}$ |
| LiF-70 | 70:30 | $3.1 \times 10^{-3}$ | $6.6 \times 10^{-9}$ |
| LiF-90 | 90:10 | $1.6 \times 10^{-3}$ | $6.9 \times 10^{-9}$ |
| LiF-100 | 100:0 | $1.8 \times 10^{-9}$ | $5.1 \times 10^{-11}$ |

The graph 200 of FIG. 2 illustrates the change in retention rate of conductivity with respect to 0 mol % LiX relative to the change in concentration of LiX in the Li buffer layer 125. An ideal characteristic of the Li buffer layer 125 is to exhibit high ionic conductivity and low electrical conductivity. Since LiX has a lower ionic conductivity than the solid lithium ion electrolyte layer 115, a decrease in the ionic conductivity of the Li buffer layer 125, with increasing concentration of LiX, is inevitable. Accordingly, it is suitable to select a LiX concentration for the Li buffer layer 125 that can maintain the high ionic conductivity while also providing lower electrical conductivity. As such, in a particular embodiment, the concentration of LiX in the Li buffer layer 125 is between about 10 mol % and about 70 mol %, and more particularly between about 30 mol % and about 50 mol %.

Also shown in FIG. 1A and FIG. 1B, is a soft solid electrolyte interface (SEI) 120 which is naturally formed between the solid lithium-ion electrolyte layer 115 and the lithium buffer layer 125 during the charging and discharging cycles of the battery 100. The soft SEI interface 120 is permeable to lithium ions and is also electrically insulating.

In a particular embodiment, the anode current collector 140 may be comprised of one or more elements including, but not limited to, nickel (Ni), copper (Cu), or a composition of stainless steel (SUS). The porous layer 135 may be comprised of one or more mixed-ion-electron conductors. The lithium metal anode 130 may be comprised of high-capacity lithium.

In the battery 100 of the present invention, a compressive stress is established between the solid lithium-ion electrolyte layer 115 and the lithium buffer layer 125. In a particular embodiment the compressive stress is between about 0.1 MPa and about 100 MPa.

Also shown in FIG. 1A, the porous layer 135 comprises a plurality of pores. As shown in FIG. 1B, the pores control the direction of the lithium plating (deposition) during the charging of the battery 100 by establishing compressive stress at the interface. In general, the porous layer 135 guides the location of the lithium deposition at the Li metal anode 130, thereby reducing the volume changes of the lithium metal anode 130 during the charge/discharge cycles by filling up the pores of the porous layer 135. The introduction of the porous structure layer 135 controls and minimizes the changes of the overall battery cell size, which contributes to the size stability when installing the battery 100 in electric vehicles (EVs) and hybrid electric vehicles (HEVs).

In confirmation of the effect of the Li buffer layer 125 in the battery 100 of the present invention, a pellet-type solid state battery is described and tested. In this exemplary embodiment, the active cathode material 110 was $LiNi_{0.6}Mn_{0.2}Co_{0.2}O_2$ (NMC) powder, carbon black conductive additive and lithium phosphorus sulfur chloride ($Li_6PS_5Cl$) powder at a weight ratio of 70:5:25, respectively, and 10 mg of the mixed powder was employed as the active cathode material 110. The solid lithium-ion electrolyte layer 115 consisted of lithium phosphorus sulfur chloride ($Li_6PS_5Cl$) powder, with 100 mg used for the solid lithium-ion electrolyte layer 115. For the Li metal anode 130, 20 μm thick laminated foil and 10 μm thick copper (Cu) were used.

The cathode active material 110, solid lithium-ion electrolyte layer 115 material and Li metal anode 130 material described above were placed in a ceramic cylinder with an internal diameter of approximately 10 mm and compressed with stainless cylinders to fabricate a pellet-type solid state battery.

Following the formation of the cathode active material layer 110, the Li buffer layer 125 was formed by compressing a 5 mg powder mixture uniformly dispersed on the solid lithium-ion electrolyte layer 115, at a pressure of 100 MPa. The all-solid-state battery was then compacted at a pressure of 400 MPa. The resulting battery prepared by the procedure described above was then connected to a potentiostat, and constant current charge/discharge tests were performed at 0.1 mA with upper and lower cutoff voltages of 4.3V and 2.7V, respectively. Additionally, a compressive stress of 100 MPa was applied to the battery during the tests. The results of the tests are shown in FIG. 3 and FIG. 4.

Figure 3:
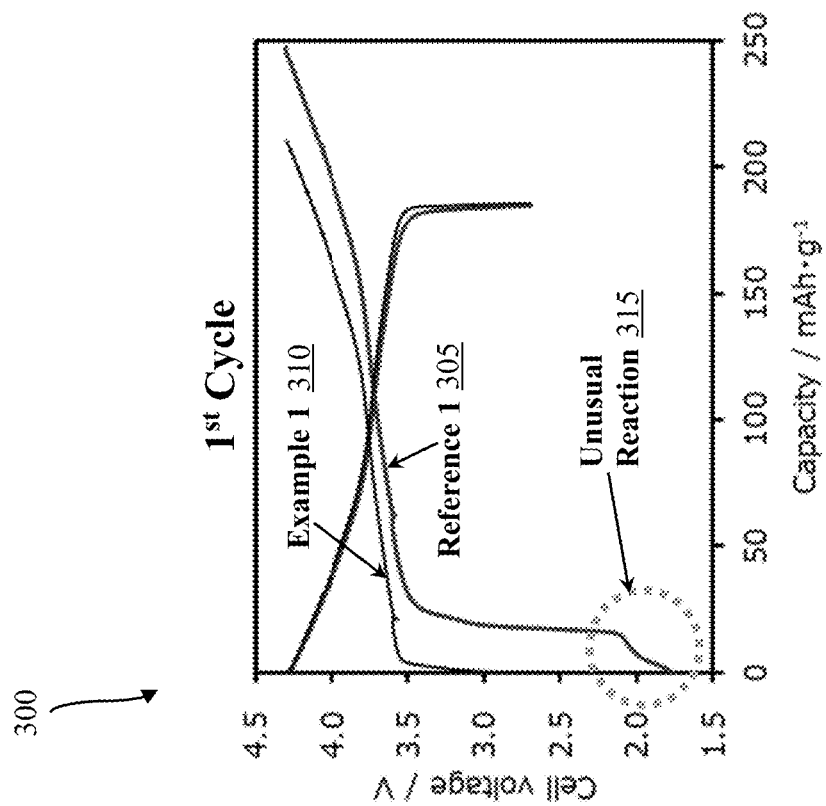
FIG. 3 is a graphical illustration of the cell voltage (V) relative to the capacity of a first exemplary lithium secondary battery during a $1^{st}$ cycle, in accordance with an embodiment of the present invention.
Figure 4:
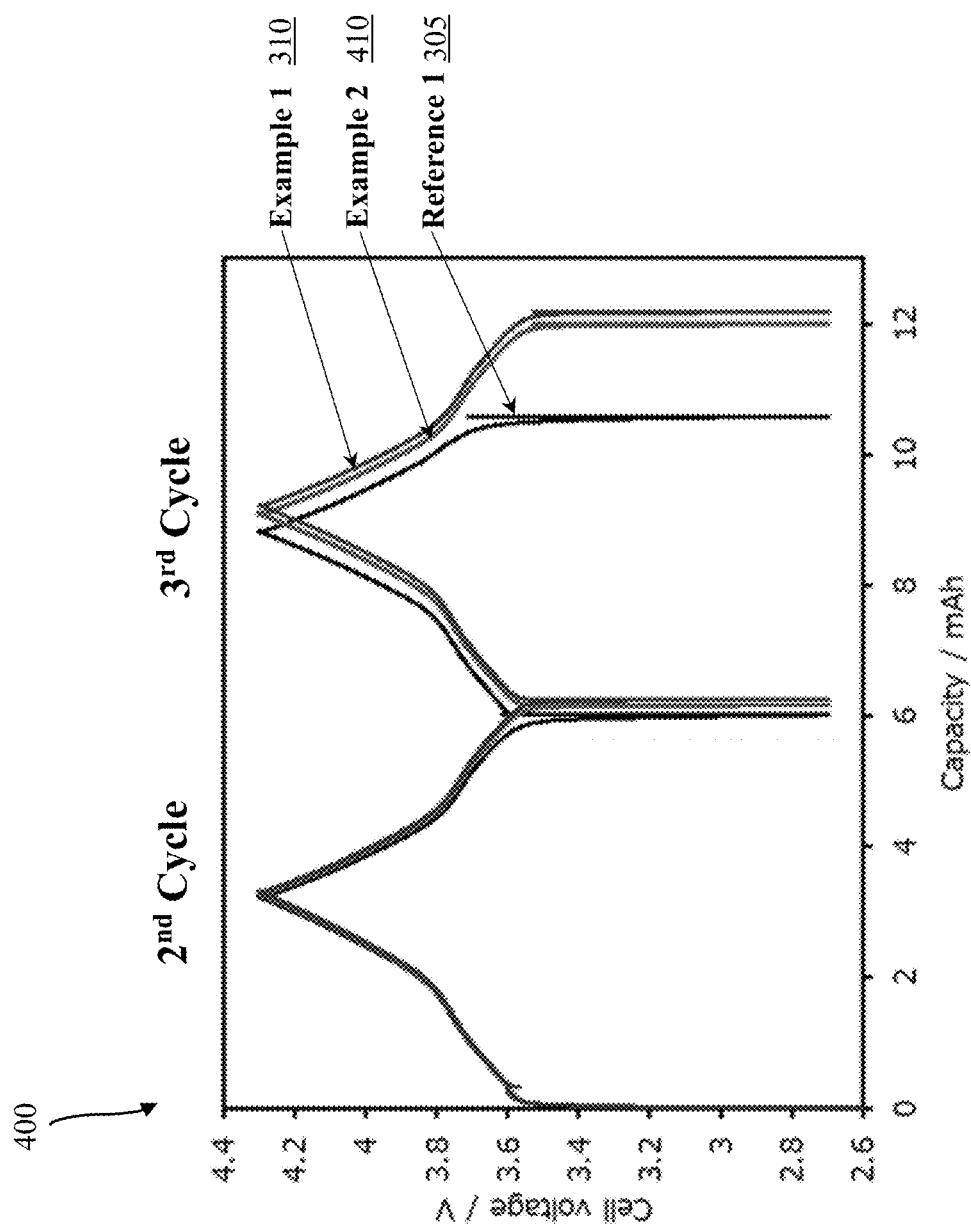
FIG. 4 is a graphical illustration of the cell voltage (V) relative to the capacity of the first and a second exemplary lithium secondary battery during a $2^{nd}$ and $3^{rd}$ cycle, in accordance with an embodiment of the present invention.

In FIG. 3 and FIG. 4, Example 1 310 is representative of a battery with a Li buffer layer 125 consisting of 30 mol % LiF, Example 2 405 is representative of a Li buffer layer 125 consisting of 50 mol % LiF and Reference 1 305 is representative of a Li buffer layer 125 consisting of 0 mol % LiF.

With reference to FIG. 3, in the graph 300 of the $1^{st}$ cycle, Example 1 310 started the first charge at approximately 3.5V. However, Reference 1 305 showed an unusual reaction 315 at about 2.0V. As shown, the $1^{st}$ cycle Coulombic efficiency was improved by 10% for Example 1 310 when compared to Reference 1 305. With reference to FIG. 4, in the graph 400 of the $2^{nd}$ and $3^{rd}$ cycles, Example 1 310 and Example 2 405 did not show noticeable capacity decay, at least to the $3^{rd}$ cycle. However, Reference 1 305, showed significant reduction in capacity in the $3^{rd}$ cycle. The results shown in FIG. 3 and FIG. 4 clearly indicate that the Li buffer layer 125 of Example 1 310 and Example 2 405 enables a uniform reaction on the Li metal anode 130 of the battery 100, which is a desirable feature for a rechargeable Li battery.

An exemplary embodiment for the fabrication of a battery which includes the porous layer 135 may involve the fabrication of a host structure. In the exemplary embodiment, materials of the structure may include an 8 μm thick copper foil as the anode current collector 140, vapor grown carbon fiber (VGCF) as the host structure, Polyvinylidene DiFluoride (PVdF) as a binder and N-methylpyrrolidone (NMP) as solvent to prepare slurries with the compositions shown in Table II below.

TABLE II

| | Binder solvent: Mw: 880000 6 wt % in NMP | | | | |
|---|---|---|---|---|---|
| Lot. No | VGCF (g) | Binder Solvent (g) | LLZO (g) | NMP (g) | Total (g) |
| SuVG_1 | 1.5 | 3 | 0 | 40 | 44.5 |
| SuVG_1 | 1.5 | 4.5 | 0 | 40 | 46 |
| VGZ1_1 | 1.5 | 5 | 1 | 40 | 47.5 |
| VGZ1_1 | 2.52 | 6.04 | 1 | 40 | 49.56 |

Figure 5:
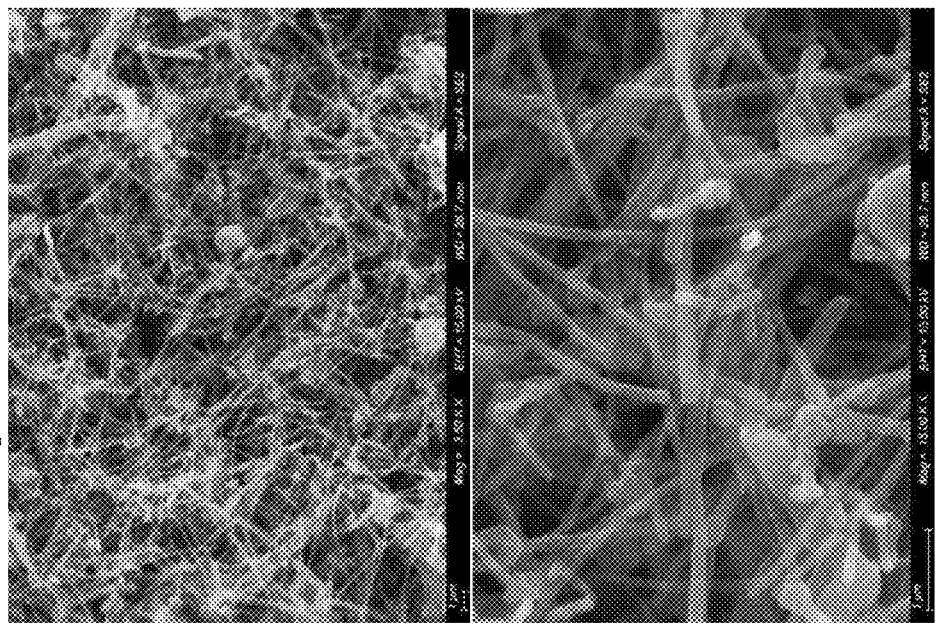
FIG. 5 is an illustration of a cross-section from a scanning electron microscope (SEM) of the host structure of the porous layer of the lithium secondary battery, in accordance with an embodiment of the present invention.

The slurries were uniformly mixed in a room temperature (25° C.) for 3 hours at 1000 rpm using a homogenizer. The prepared slurries were applied to the copper foil using a bar coater with 50 mil gap. Following the application of the slurry, the resulting electrode was dried for 12 hours at 120° C. using a vacuum dryer. The dried electrode was then punched to a circular electrode with a diameter of 10 mm and dried for 24 hours at 80° C. using a vacuum drier, similar to the drying step previously described. To provide the compression properties of the structure, the above host structure was clamped with stainless steel dies, compressed at 0.1 MPa using a hydraulic press and the porosity was then determined by structural analysis and the weight/thickness of the film. Confirmation of the pores present in the above-described host structure of the porous layer 135 were provided by a scanning electron microscope. The results of the scan are shown in FIG. 5.

An exemplary test battery was fabricated including the cathode layer 105, 110, the solid lithium-ion electrolyte layer 115 and Li metal layer 130, which were previously formed, with the above-described host structure on top. The layers were stacked and bonded with a compressive stress. In particular, the compressing pressure was controlled to between about 0.1 MPa and about 10 MPa. However, a lower pressure is desired for maintaining the porosity in the porous layer 135.

Figure 6:
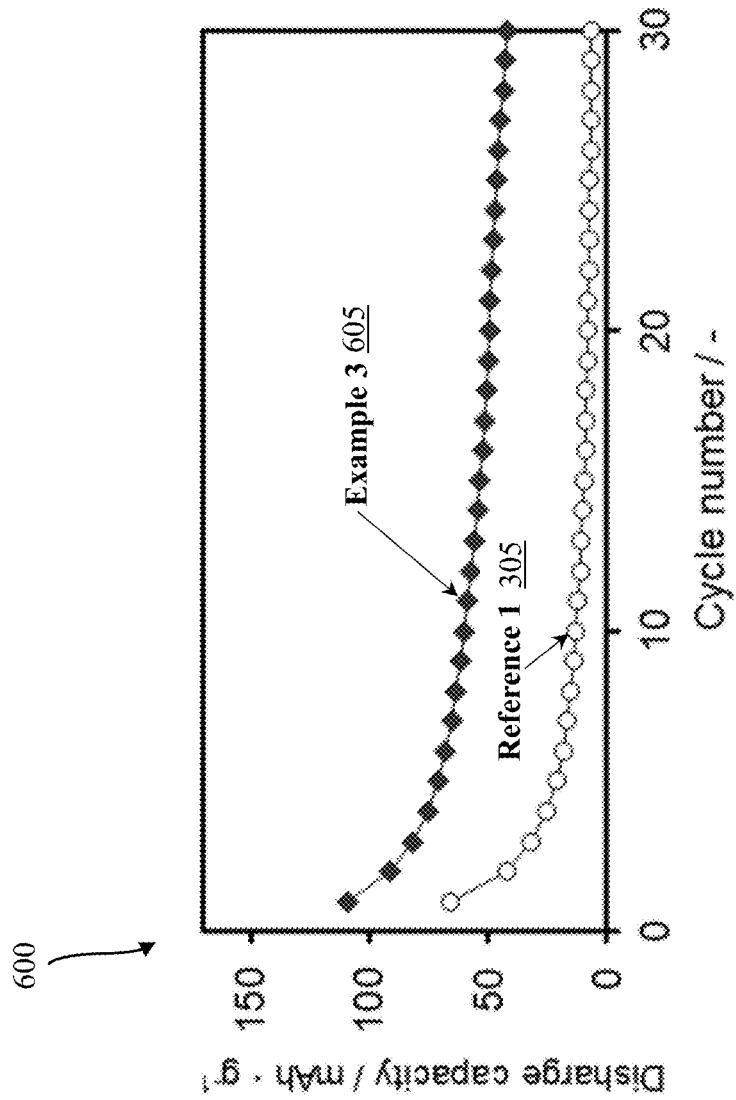
FIG. 6 is a graphical illustration of the discharge capacity relative to the cycle number of the third exemplary lithium secondary battery, in accordance with an embodiment of the present invention.

To verify the charge/discharge cycle results of the lithium secondary battery of the present invention, the exemplary test battery prepared by the above-described procedure was connected to a potentiostat and constant current charge/discharge tests were performed at 0.1 mA with upper and lower cutoff voltages of 4.3V and 2.8V, respectively. Additionally, the battery cell was compressed at 0.1 MPa during the tests to maintain the porosity of the porous layer 135. The results of the cycle test are shown in FIG. 6. As can be seen in the graph 600 of FIG. 6, after 30 cycles, Example 3 605, which includes the porous layer 135, shows 10 times more capacity compared with the Reference 1 305, clearly indicating that the cycle performance was improved by absorbing the volume change with charge/discharge reactions by the host layer of the porous layer 135.

The all-solid-state lithium secondary battery of the present invention provides for uniform lithium deposition to prevent the formation of dendrites, while also establishing a controlled growth of lithium in a specific direction and into a designated area of the battery cell. With these distinct features, the battery cell will have a prolonged lifetime with stable charge/discharge performance and controlled volumetric change of the battery cell.

While the illustrated embodiments are directed to a battery comprising a solid-state electrolyte, this is not intended to be limiting and it is within the scope of the invention for the battery cell to alternatively comprise a hybrid-electrolyte including a mixture of liquid and solid electrolyte.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A lithium secondary battery comprising:
    a lithium (Li) metal anode layer;
    a cathode layer;
    an electrolyte layer positioned between the Li metal anode layer and the cathode layer;
    a Li buffer layer compressed between the Li metal anode layer and the electrolyte layer;
    an anode current collector; and
    a porous layer positioned between the Li metal anode layer and the anode current collector, wherein the porous layer guides lithium deposition from the Li metal anode layer between the Li buffer layer and the anode current collector, during charge and discharge cycles of the lithium secondary battery, wherein the Li buffer layer comprises lithium, a solid electrolyte, and lithium fluoride (LiF), the lithium fluoride (LiF) in the Li buffer layer having a number of mols between 10% and 70% of a total of a number of mols of the lithium and a number of mols of the solid electrolyte, the Li buffer layer being compressed between the Li metal anode layer and the electrolyte layer at a pressure of at least 0.1 MPa (megapascal), and
    wherein the porous layer comprises $Li_{6.4}Ga_{0.2}La_3Zr_2O_{12}$ (Ga-LLZO) and carbon fiber.

2. The lithium secondary battery of claim 1, wherein the cathode layer comprises:
    a cathode current collector; and
    a cathode active material positioned between the cathode current collector and the electrolyte layer.

3. The lithium secondary battery of claim 2, wherein the cathode active material comprises $LiNi_{0.6}Mn_{0.2}Co_{0.2}O_2$ (NMC) powder, carbon black conductive additive and lithium phosphorus sulfur chloride ($Li_6PS_5Cl$) powder at a weight ratio of 70:5:25, respectively.

4. The lithium secondary battery of claim 1, wherein the number of mols of lithium fluoride (LiF) in the Li buffer layer is between 30% and 50%.

5. The lithium secondary battery of claim 1, wherein the Li buffer layer has a lower Li-ion conductivity than the electrolyte layer.

6. The lithium secondary battery of claim 1, wherein the electrolyte layer is a solid Li-ion electrolyte.

7. The lithium secondary battery of claim 1, wherein the electrolyte layer comprises lithium phosphorus sulfur chloride ($Li_6PS_5Cl$) powder.

8. The lithium secondary battery of claim 1, wherein the electrolyte layer is a hybrid-electrolyte comprising a mixture of liquid and solid Li-ion electrolyte.

9. The lithium secondary battery of claim 1, wherein the Li metal anode layer comprises Li metal and copper (Cu).

10. A method for manufacturing a lithium secondary battery, the method comprising:
    providing a cathode layer;
    positioning an electrolyte adjacent to the cathode layer;
    positioning a Li buffer layer adjacent to the electrolyte layer;
    establishing a compressive stress between the Li buffer layer and the electrolyte layer;
    positioning a Li metal anode layer on the Li buffer layer;
    positioning a porous layer on the Li metal anode layer; and
    positioning an anode current collector on the porous layer, wherein the Li buffer layer comprises lithium, a solid electrolyte, and lithium fluoride (LiF), the lithium fluoride (LiF) in the Li buffer layer having a number of mols between 10% and 70% of a total of a number of mols of the lithium and a number of mols of the solid electrolyte, and wherein the porous layer comprises $Li_{6.4}Ga_{0.2}La_3Zr_2O_{12}$ (Ga-LLZO) and carbon fiber.

11. The method of claim 10 wherein the electrolyte layer comprises solid phosphorus sulfur chloride ($Li_6PS_5Cl$) and wherein the Li buffer layer has a lower Li-ion conductivity than the electrolyte layer.

\* \* \* \* \*